US008287698B2

(12) United States Patent
Martins De Queiroz Guimarães et al.

(10) Patent No.: US 8,287,698 B2
(45) Date of Patent: Oct. 16, 2012

(54) PROCESS AND SYSTEM FOR PRODUCING ALCOHOL BY SPLIT-FEED DISTILLATION

(75) Inventors: Flávio Martins De Queiroz Guimarães, Rio de Janeiro (BR); Carlos Eduardo Fontes Da Costa E Silva, Rio de Janeiro (BR); Adler Gomes Moura, Santa Barbara D'Oeste (BR)

(73) Assignees: Siemens Ltda., Sao Paulo (BR); Dedini S/A Industrias de Base, Piracicaba (BR)

( * ) Notice: Subject to any disclaimer, the term of this patent is extended or adjusted under 35 U.S.C. 154(b) by 740 days.

(21) Appl. No.: 12/280,618

(22) PCT Filed: Feb. 7, 2007

(86) PCT No.: PCT/BR2007/000029
§ 371 (c)(1),
(2), (4) Date: May 8, 2009

(87) PCT Pub. No.: WO2007/095706
PCT Pub. Date: Aug. 30, 2007

(65) Prior Publication Data
US 2009/0324796 A1    Dec. 31, 2009

(30) Foreign Application Priority Data

Feb. 24, 2006    (BR) ..................................... 0600553

(51) Int. Cl.
*B01D 3/14* (2006.01)
*B01D 3/28* (2006.01)
*C12G 1/00* (2006.01)
*C12G 3/12* (2006.01)

(52) U.S. Cl. ................ 203/25; 203/72; 203/75; 203/77; 203/78; 203/80; 203/89; 203/91; 203/98; 203/DIG. 8; 203/DIG. 9; 203/DIG. 13; 426/494; 426/592

(58) Field of Classification Search .................... 203/25, 203/72, 75, 77, 78, 80, 89, 91, 98, DIG. 8, 203/DIG. 9, DIG. 13; 426/494, 592; 568/913
See application file for complete search history.

(56) References Cited

U.S. PATENT DOCUMENTS 1,822,455 A * 9/1931 Ricard et al. .................... 203/19
(Continued)

FOREIGN PATENT DOCUMENTS
BR    PI 0302605-1    3/2005
(Continued)

OTHER PUBLICATIONS

PCT Search Report and Written Opinion for PCT/BR2007/000029 dated May 31, 2007.
(Continued)

*Primary Examiner* — Virginia Manoharan
(74) *Attorney, Agent, or Firm* — Alston & Bird LLP

(57) ABSTRACT

The present invention relates to a process and a system for producing alcohol by distillation with energy optimization using split-feed technology. The process of the present invention comprises the steps of: a) splitting a stream of wine to feed two depuration columns, the depuration column generating a stream of phlegma and the depuration column generating a stream of phlegma and a stream of vinasse; b) feeding the stream of phlegma into at least one rectification column generating a top flow and a stream of hydrated alcohol; c) effecting the heat exchange between the top flow from at least one rectification column and the stream of vinasse from the depuration column in at least one heat exchanger; and d) feeding the stream of phlegma into a rectification column generating a stream of hydrated alcohol. The present invention further relates to hydrated alcohol produced by the process described above and to a process for producing anhydrous alcohol.

38 Claims, 2 Drawing Sheets

U.S. PATENT DOCUMENTS

| | | | | |
|---|---|---|---|---|
| 3,420,748 | A * | 1/1969 | Lupfer et al. | 203/1 |
| 4,217,178 | A * | 8/1980 | Katzen et al. | 203/19 |
| 4,246,073 | A | 1/1981 | Umeda et al. | |
| 4,306,942 | A * | 12/1981 | Brush et al. | 203/19 |
| 4,422,903 | A * | 12/1983 | Messick et al. | 203/19 |
| 4,582,570 | A | 4/1986 | Mix | |
| 4,692,218 | A * | 9/1987 | Houben et al. | 203/19 |
| 5,035,776 | A * | 7/1991 | Knapp | 203/19 |
| 2005/0266539 | A1 * | 12/2005 | Hochberg et al. | 435/161 |
| 2007/0272540 | A1 * | 11/2007 | Siegert et al. | 203/80 |
| 2008/0194846 | A1 * | 8/2008 | Herguijuela et al. | 549/413 |

FOREIGN PATENT DOCUMENTS

| | | |
|---|---|---|
| EP | 1 452 219 | 9/2004 |
| WO | WO 88/02649 | 4/1988 |

OTHER PUBLICATIONS

International Preliminary Report on Patentability dated Jun. 13, 2008.

\* cited by examiner

PROCESS AND SYSTEM FOR PRODUCING ALCOHOL BY SPLIT-FEED DISTILLATION

FIELD OF THE INVENTION

The present invention relates to a process and a system for producing alcohol by distillation with energy optimization using split-feed technology.

The present invention further relates to hydrated alcohol produced by the process described and to a process for producing anhydrous alcohol.

In Brazil, almost all alcohol is produced by the distillation of fermented sugar cane musts (wort) obtained from sugar cane. After fermentation, sugar cane must is called wine (mash) or liquor. Two types of alcohol are produced: hydrated alcohol (>92.6° INPM) and anhydrous alcohol (>99.3° INPM), following the official specifications.

The separation of alcohol from wine is traditionally done through the process described in the paper titled "Brazilian Alcohol Program: An Overview" by Goldemberg, J. and Macedo, I., published in "Energy for Sustainable Development," Volume 1 , N° 1 , May, 1994 , which is:

Wine or liquor is fed into a first column, called depuration or distillation column. In this stage, ethanol is separated from wine (initially at 7-10° GL) as vapor (phlegma at 40-50° GL). The bottom product, vinasse (stillage), contains most of the salts and suspensions of solids, it is generally used as fertilizer and should not exceed the limit of 0.03° GL of alcohol in its composition. This column is heated by direct steam injection. The phlegma from the depuration column feeds into a second column, called rectification column, and some impurities are removed (such as fusel oil, recovered for special applications). Alcohol is then concentrated to 96° GL, and the phlegmasse (the effluent from the rectification column) obtained as a bottom product of this second column may be discarded together with the vinasse or recycled to the first column.

The rectification part is traditionally done as an arrangement using two columns. The columns are in general of bubble cap plates. Another more current arrangement differs from the previous one in that it has a rectification column and the phlegmasse recycles to the top of the distillation column, not being discarded as it happens in the previous arrangement. This type of configuration may employ bubble cap plates, however, sieve plates are more widely used.

BACKGROUND OF THE INVENTION

The existing technology for the distillation systems dates from 50 to 60 years ago. In spite of that, it is still possible to further improve energy optimization.

The following documents are herein described as prior-art references with regard to distillation processes with energy optimization. However, none of them anticipate the matter of the present invention.

Katzen, R. discloses in his paper titled "A Low Energy Distillation System for the Production of Ethanol Fuel" ("*Sistema de Destilacão de Baixo Consumo Energético para a Producão de Etanol Carburante*", Copersucar International Symposium on Sugar and Alcohol, p. 560 , São Paulo, June, 1985) a study about an energy optimization system for the production of anhydrous alcohol fuel, working with columns at different pressures. The top product of the highest pressure column acts as a reboiler of the other columns operating at atmospheric pressure. With this, the system presents a reduction in the consumption of steam.

Leppanen, O. in his paper titled "Energy Consumption in the Distillation of Fuel Alcohol" (Copersucar International Symposium on Sugar and Alcohol, São Paulo, June, 1985) also relates to energy optimization in the process of anhydrous alcohol distillation using columns at different pressures. In this paper, two case studies were made: one of them used a higher pressure at the rectification column (4.5 bar) and atmospheric pressure in the dehydration and evaporation columns. The other system used the dehydration column operating at a reduced pressure (about 0.6 bar). The two results have presented a lower steam consumption when compared to the conventional system. Comparing both of them, it is noted that there is a lower consumption of steam in the system utilizing higher pressure columns. As cited in the abovementioned paper, the use of a distillation column operating at a lower pressure reduces the consumption of steam. With the use of a vacuum column, the pressure delta between the columns could be even higher and the steam consumption could be further reduced. However, this system requires special care, such as, for instance, with the fact that the alcohol-water azeotrope disappears at the pressure of 0.1 bar. In addition, there is a need to minimize the head loss in the column.

U.S. Pat. No. 6,171,449 (Washington Group International) discloses a process for the distillation separation of styrene monomer from ethylbenzene utilizing the split-feed technology. Although it is not specifically directed to the production of alcohol, this patent describes a distillation process wherein a stream is split to feed into two distillation columns, one at high pressure and the other at low pressure, together with a reboiler that uses the thermal energy of the top of one column to supply heat to the other.

Patent application JP 58-183634 (Japanese Industry and Foreign Trade Ministry) discloses a process for producing anhydrous ethanol by the split-feed system wherein the feed is fed in series into at least two distillation columns operating at low pressure. The product is taken from the last column in the form of vapor and is fed into an adsorption column, which adsorbs moisture in order to obtain anhydrous ethanol. At the same time, part or all of the reflux liquid at the last column is fed with the fraction of the distillation columns except the final one.

Patent application PI 8203199 (Codistil SA Dedini) discloses a system for producing alcohol employing a split-feed distillation process, wherein the liquid load is split into two columns: a distillation column for the water and alcohol mixture and a rectification column for the distilled product, both being fed in parallel with the water and alcohol mixture of the process. The energy used is high-pressure steam, injected in the first column, and the top vapors emitted by it are used for heating the second column. In both columns, the heating process is obtained using a vertical thermosiphon reboiler.

Patent application PI 0302605-1 (Dedini S/A Indústrias de Base) discloses a process for producing anhydrous alcohol from a main stream of sugar cane wine to be fed to the steps of distillation and dehydration. This process comprises the steps of: a) removing a secondary stream of wine from a primary stream of wine; b) distilling the secondary stream of wine separately from the primary stream, so as to produce a condensed phlegma; c) recycling the stream of condensed phlegma to the primary stream of wine; d) simultaneously distilling said streams of condensed phlegma with the primary stream of wine, in order to produce a stream of hydrated alcohol and e) dehydrating the stream of hydrated alcohol in a dehydration column by means of the condensation heat of a stream of phlegma vapor from the distillation of the secondary stream of wine.

OBJECT OF THE INVENTION

The energy integration of chemical processes became a concern for Chemical Engineering in the beginning of the 1970s, at the time of the world oil crisis. Until then, the possibility of reducing the energy consumption of an industrial unit by means of the thermal integration of different streams and process equipment was less important than the current concern with this issue.

The unit operation requiring greater attention is distillation, because the separation columns involve the highest consumption of utilities in a chemical plant.

Since the beginning of the 1980s, several techniques have been presented for optimizing the operation of an individual column and for providing the energy integration of the columns in a process. The main column integration methods are based on increasing the operating pressure of some columns, in some cases, obtaining up to 50% savings.

In a split-feed distillation process, the energy integration of the columns is based on the operating pressure differences between them. The pressurized columns are responsible for generating sufficient thermal load for the operation of the vacuum column. With this, there is a reduction in the consumption of hot and cold utilities in the process.

In distillation plants that use split-feed technology, the stream is split between two columns that operate at different pressures. The high-pressure column will have a thermal load in its top product that may be used as a reboiler of the low-pressure column. With this, there is a reduction in the consumption of the utilities needed for generating thermal load.

Engelien, H. K. and Skogestad, S., in their paper titled "Multi-Effect Distillation Applied to an Industrial Case Study" (Chemical Engineering and Processing. 44 , p. 819-826, 2005), have simulated three cases: without energy integration; a multi-effect indirect split arrangement and a multi-effect prefractionator arrangement to check which of the arrangements would have a lower steam consumption. The study has shown that if a retrofit of the columns were to be carried out, then the indirect split arrangement would be the most suitable option; if, however, a new plant were to be built, then the integrated prefractionator arrangement should be considered, as it has the lowest steam consumption.

The present invention relates to a process and a system for producing alcohol, particularly ethanol, by distillation with energy optimization using split-feed technology.

The process and system of the present invention enable the production of alcohol by distillation using split-feed technology with low pressure and low head loss. There is a minimum pressure increase in the steam flows used in the depuration and rectification columns, which causes a higher reduction in the consumption of hot and cold utilities in the process needed for generating thermal load. In addition, there is a low head loss (<0.25 bar) because of the heat exchanger used in the present invention, which enables heat exchanges with small temperature differences between the exchange fluids, and the last rectification column used, which is preferably vacuum-operated and comprises a packing section.

DESCRIPTION OF THE INVENTION

Figure 1:
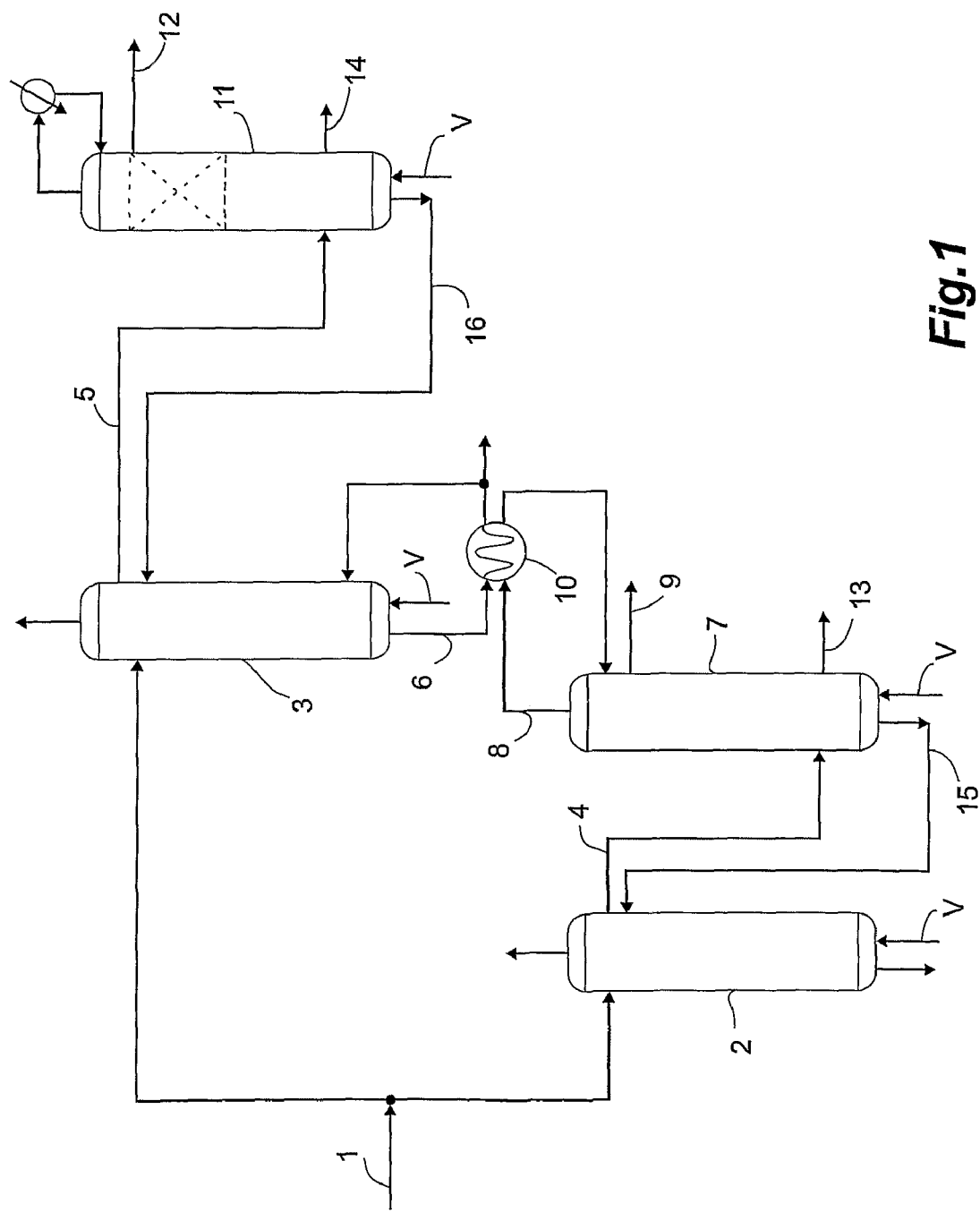
FIG. 1 represents a flow diagram of the process for producing alcohol by split-feed distillation according to present invention, showing essential, preferential and optional streams and pieces of equipment, from the wine feed to the resulting hydrated alcohol.

The present invention relates to a process and a system for producing alcohol by distillation with energy optimization using split-feed technology.

The process of the present invention comprises the steps of:
a) splitting a stream of wine 1 to feed two depuration columns 2 and 3, the depuration column 2 generating a stream of phlegma 4 and the depuration column 3 generating a stream of phlegma 5 and a stream of vinasse 6;
b) feeding the stream of phlegma 4 into at least one rectification column 7 generating a top flow 8 and a stream of hydrated alcohol 9;
c) effecting the heat exchange between the top flow 8 from at least one rectification column 7 and the stream of vinasse 6 from the depuration column 3 in at least one heat exchanger 10; and
d) feeding the stream of phlegma 5 into a rectification column 11 generating a stream of hydrated alcohol 12.

Therefore, the system of the present invention comprises:
a) a depuration column 2 receiving part of a stream of wine 1 generating a stream of phlegma 4;
b) a depuration column 3 receiving the other part of a stream of wine 1 generating a stream of phlegma 5 and a stream of vinasse 6;
c) at least one rectification column 7 receiving the stream of phlegma 4 generating a top flow 8 and a stream of hydrated alcohol 9;
d) at least one heat exchanger 10 effecting the heat exchange between the top flow 8 from at least one rectification column 7 and the stream of vinasse 6 from the depuration column 3; and
e) a rectification column 11 receiving the stream of phlegma 5 generating a stream of hydrated alcohol 12.

The present invention further relates to the hydrated alcohol produced by the process described above and a process for producing anhydrous alcohol comprising the process described above and a later step of dehydrating the hydrated alcohol thus produced.

DETAILED DESCRIPTION OF THE INVENTION

One of the objectives of the present invention is to provide a process for producing alcohol by split-feed distillation, comprising the following steps:
a) splitting a stream of wine 1 to feed two depuration columns 2 and 3, the depuration column 2 generating a stream of phlegma 4 and the depuration column 3 generating a stream of phlegma 5 and a stream of vinasse 6;
b) feeding the stream of phlegma 4 into at least one rectification column 7 generating a top flow 8 and a stream of hydrated alcohol 9;
c) effecting the heat exchange between the top flow 8 from at least one rectification column 7 and the stream of vinasse 6 from the depuration column 3 in at least one heat exchanger 10; and
d) feeding the stream of phlegma 5 into a rectification column 11 generating a stream of hydrated alcohol 12.

The process according to the present invention enables the depuration column 2 and said at least one rectification column 7 to operate at low pressure, for instance, in the range of 10 to 25 mwc (meters of water column) absolute, which is equivalent to a range of about 98 to 245 kPa absolute. Preferably, the depuration column 3 and the rectification column 11 are vacuum-operated. The arrangement described above of pressurized columns and vacuum columns shows a better balance between the consumption of steam and the production of hydrated alcohol.

Said at least one heat exchanger 10 used in the process is preferably a falling film type heat exchanger. It is a construction of tubes made of shielded stainless steel, wherein the top flow 8 from at least one rectification column 7 circulates between the tubes and the stream of vinasse 6 from the depuration column 3; and flows along the internal wall of the tube. The great advantage of the falling film heat exchanger is that it provides a very high heat transfer rate by unit of liquid volume.

As the operation of this type of heat exchanger prevents the formation of a liquid column, the falling film heat exchanger has the advantage of causing a lower head loss, when compared to that found when other heat exchangers are used, such as, for instance, the vertical thermosiphon reboiler used in the process described in patent application PI 8203199. In addition, this heat exchanger enables heat exchange with a lower temperature difference between the streams because it has a higher heat exchange coefficient.

The falling film exchanger is the preferred exchanger for the process of the present invention because it enables heat exchanges with small temperature differences between the exchange fluids, also being easy to control, enabling the split-feed distillation process to be effected at low pressure and with a low head loss.

After going through said at least one heat exchanger 10, the top flow 8 recycles into said at least one rectification column 7 and the stream of vinasse 6 recycles into the depuration column 3.

Optionally, fusel oil may be removed from rectification columns 7 and 11, generating streams 13 and 14, respectively.

Rectification columns 7 and 11 also generate streams of phlegmasse 15 and 16, respectively, which may be discarded or, preferably, may recycle to depuration columns 2 and 3, respectively.

Figure 2:
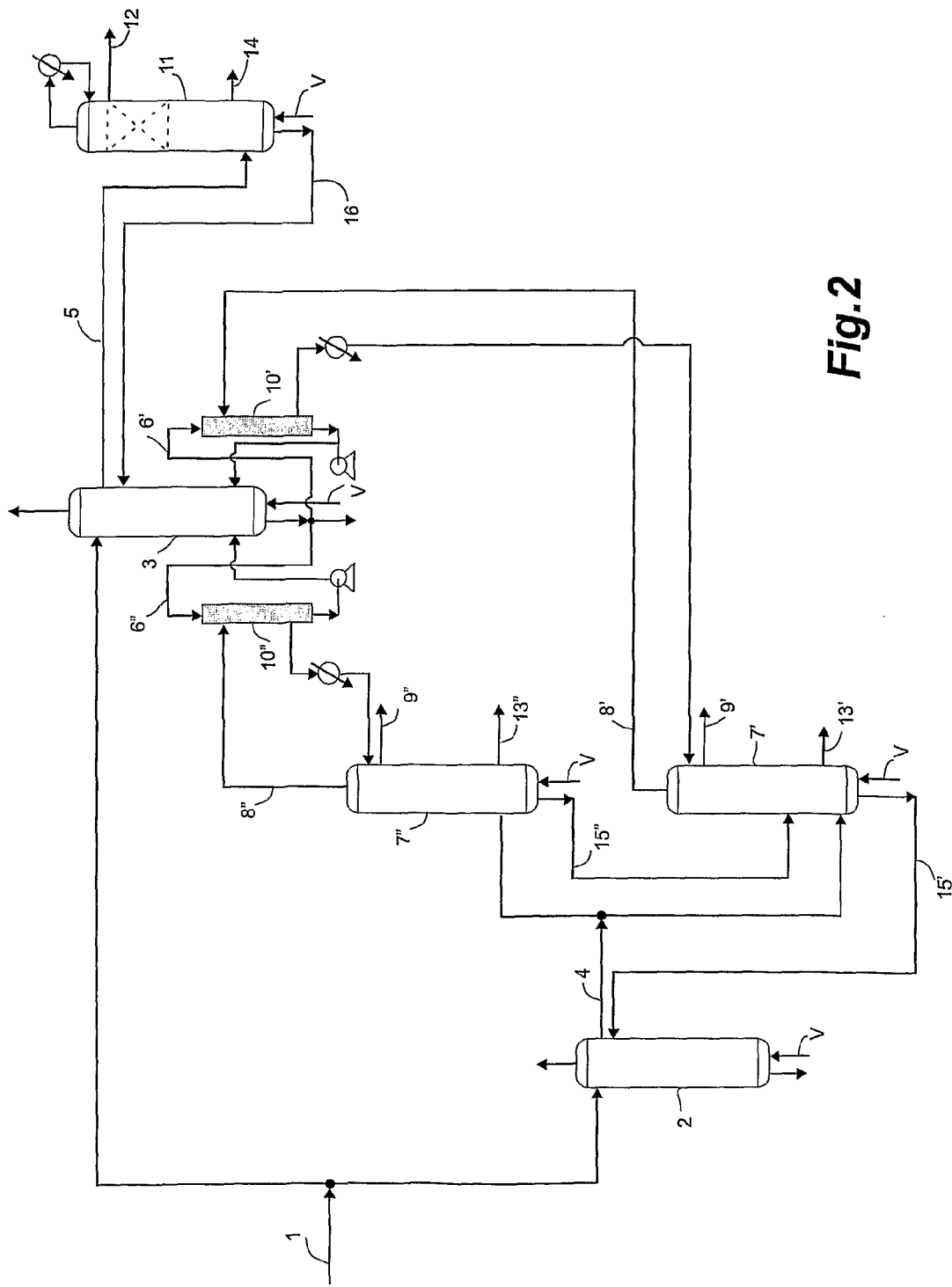
FIG. 2 represents a flow diagram of a preferred embodiment of the process for producing alcohol by split-feed distillation according to present invention, showing essential, preferential and optional streams and pieces of equipment, from the wine feed to the resulting hydrated alcohol.

In a preferred embodiment of the present invention, represented by the flow diagram of FIG. 2, the process described above is presented as follows:

i) a stream of phlegma 4 is split to feed two rectification columns 7' and 7", each one generating a top flow 8' and 8" and a stream of hydrated alcohol 9 and 9", respectively;

ii) a stream of vinasse 6 from the depuration column 3 is split into two streams of vinasse 6' and 6";

iii) the top flow 8' from the rectification column 7' exchanges heat with the stream of vinasse 6' in a heat exchanger 10'; and iv) the top flow 8" from the rectification column 7" exchanges heat with the stream of vinasse 6" in a heat exchanger 10".

As previously mentioned, also in this preferred embodiment of the invention, the depuration column 2 and rectification columns 7' and 7" may operate at low pressure, for instance, in the range of 10 to 25 mwc (meters of water column) absolute, which is equivalent to a range of about 98 to 245 kPa absolute. Preferably, the depuration column 3 and the rectification column 11 are vacuum-operated.

The heat exchangers 10' and 10" are preferably falling film heat exchangers, as mentioned above. After going through heat exchanger 10', the top flow 8' recycles into the rectification column 7' and the stream of vinasse 6' recycles into the depuration column 3. Similarly, after going through the heat exchanger 10", the top flow 8" recycles into the rectification column 7" and the stream of vinasse 6" recycles into the depuration column 3.

Optionally, fusel oil may be removed from rectification columns 7' and 7" and 11, generating streams 13', 13" and 14, respectively.

Rectification columns 7', 7" and 11 also generate streams of phlegmasse 15', 15" and 16, respectively. The stream of phlegmasse 15" may be discarded or, preferably, may be fed into the rectification column 7'. The streams of phlegmasse 15' and 16 may be discarded or, preferably, may recycle to depuration columns 2 and 3, respectively.

Another preferred embodiment of the present invention relates to the rectification column 11. To reduce the total head loss in the split-feed arrangement of the present invention, the rectification column 11 preferably comprises at least one packing section.

The use of packing sections enables not only a large reduction in the head loss but it is also the ideal type of column packing for the operation in the spray regime, as may be the case of rectification column 11. In addition, as the packing section is in a region operating at low temperatures, the use of plastic packing becomes feasible. This type of packing has a reduced cost and is not chemically sensitive. Particularly, said at least one packing section of rectification column 11 comprises random packing or plastic packing, such as Pall Ring packing.

According to this embodiment of the present invention, high oil, which is an important by-product of the process, does not form two phases in the removal region, and thus a partial removal of these components may occur at the packing section of rectification column 11. Low oil, which is another important by-product of the process, may form two phases in the region of the column where it is removed. This possibility increases in vacuum operation, because the temperatures are lower (50-60° C.) than at atmospheric pressure operation.

Therefore, preferably, the rectification column 11 comprises a valve plate section below the packing section, and a sieve plate section below the valve plate section, which cause lower head loss.

Particularly, the rectification column 11 comprises at least one packing section, aiming at reducing the head loss in the process and removing the end product (hydrated alcohol) and high oil, and two other plate sections. One of them uses sieve plates and the other uses valve plates for removing the low oil. Thus, low oil is collected in a valve plate section while the sieve plate section ensures a further reduction in the head loss of the rectification column 11, which means a better performance of the heat exchangers used in energy integration.

Another objective of the present invention is to provide a system for producing alcohol by split-feed distillation, comprising:

a) a depuration column 2 receiving part of a stream of wine 1 generating a stream of phlegma 4;

b) a depuration column 3 receiving the other part of a stream of wine 1 generating a stream of phlegma 5 and a stream of vinasse 6;

c) at least one rectification column 7 receiving the stream of phlegma 4 generating a top flow 8 and a stream of hydrated alcohol 9;

d) at least one heat exchanger 10 effecting the heat exchange between the top flow 8 from at least one rectification column 7 and the stream of vinasse 6 from the depuration column 3; and e) a rectification column 11 receiving the stream of phlegma 5 generating a stream of hydrated alcohol 12.

The system according to the present invention enables the depuration column 2 and said at least one rectification column 7 to operate at low pressure, for instance, in the range of 10 to 25 mwc (meters of water column) absolute, which is equivalent to a range of about 98 to 245 kPa absolute. Preferably, the depuration column 3 and the rectification column 11 are vacuum-operated. The arrangement described above of pressurized columns and vacuum columns shows a better balance between the consumption of steam and the production of hydrated alcohol.

Said at least one heat exchanger 10 used in the process is preferably a falling film type heat exchanger.

Preferably, said at least one rectification column 7 receives the top flow 8 and the depuration column 3 receives the stream of vinasse 6, after said streams have gone through said at least one heat exchanger 10.

Optionally, fusel oil may be removed from rectification columns 7 and 11, generating streams 13 and 14, respectively.

Rectification columns 7 and 11 also generate streams of phlegmasse 15 and 16, respectively, which may be discarded or, preferably, may recycle to depuration columns 2 and 3, respectively.

In a preferred embodiment of the present invention, represented by the flow diagram of FIG. 2, the system described above is presented as follows:
  i) said at least one rectification column 7 consists of two rectification columns 7' and 7", each one generating a top flow 8' and 8" and a stream of hydrated alcohol 9' and 9", respectively;
  ii) a stream of vinasse 6 from the depuration column 3 is split into two streams of vinasse 6' and 6";
  iii) the at least one heat exchanger 10 consists of two heat exchangers 10' and 10";
  iv) the heat exchanger 10' effects the heat exchange between the top flow 8' from the rectification column 7' and the stream of vinasse 6'; and
  v) the heat exchanger 10" effects the heat exchange between the top flow 8" from the rectification column 7" and the stream of vinasse 6".

As previously mentioned, also in this preferred embodiment of the invention, the depuration column 2 and rectification columns 7' and 7" may operate at low pressure, for instance, in the range of 10 to 25 mwc (meters of water column) absolute, which is equivalent to a range of about 98 to 245 kPa absolute. Preferably, the depuration column 3 and the rectification column 11 are vacuum-operated.

The heat exchangers 10' and 10" are preferably falling film heat exchangers, as mentioned above. Preferably, said at least one rectification column 7' receives the top flow 8' and the depuration column 3 receives the stream of vinasse 6', after said streams have gone through the heat exchanger 10'. Similarly, the rectification column 7" receives the top flow 8" and the depuration column 3 receives the stream of vinasse 6", after said streams have gone through the heat exchanger 10".

Optionally, fusel oil may be removed from rectification columns 7' and 7" and 11, generating streams 13', 13" and 14, respectively.

Rectification columns 7', 7" and 11 also generate streams of phlegmasse 15', 15" and 16, respectively, which may be discarded or reused. Preferably, rectification column 7' receives the stream of phlegmasse 15" and depuration columns 2 and 3 receive the streams of phlegmasse 15' and 16, respectively.

Another preferred embodiment of the system of the present invention relates to rectification column 11, as already mentioned above in relation to the process of the present invention. To reduce the total head loss of the system, rectification column 11 preferably comprises at least one packing section, preferably, of plastic packing or random packing.

Therefore, rectification column 11 comprises a valve plate section below the packing section, and a sieve plate section below the valve plate section, which cause lower head loss.

Therefore, the process and system described above enable the production of alcohol by distillation using split-feed technology with energy optimization, low pressure and low head loss. The depuration column 2 and said at least one rectification column 7 may operate at low pressure, for instance, in the range of 10 to 25 mwc (meters of water column) absolute, which is equivalent to a range of about 98 to 245 kPa absolute. Thanks to the present invention, there is a minimum pressure increase in the steam flows V of the depuration and rectification columns, which causes a higher reduction in the consumption of hot and cold utilities of the process needed for generating thermal load, and also results in lower costs.

In addition, there is low total head loss in the system (<0.25 bar) because of the use of said at least one heat exchanger 10, which enables heat exchanges with small temperature differences between the exchange fluids, and is easy to control, and of rectification column 11, which is preferably vacuum-operated and comprises a packing section with higher plate efficiency.

The process steps and the system equipment of the present invention are closely interlinked, which causes the parameters and characteristics of one column to decisively affect the others. Even with these difficulties and restrictions, the process and system of the present invention enable an operational allowance of about 15%, which can be reverted into a better performance of the heat exchange equipment used for energy integration.

The present invention further relates to hydrated alcohol produced by the process herein described.

The present invention also relates to a process for producing anhydrous alcohol comprising the process described above and a later step of dehydrating the hydrated alcohol thus produced. For example, the hydrated alcohol produced by the process of the present invention may feed into a dehydration column to which benzene is added at the top in order to form a ternary azeotrope benzene-water-alcohol mixture, thus enabling to remove anhydrous alcohol from the bottom of the column. Another example would be to send the hydrated alcohol produced by the process of the present invention to a system of molecular sieves in order to effect the dehydration of the hydrated alcohol thus forming anhydrous alcohol.

It is to be understood that the scope of the present invention embraces other embodiments besides the ones described in the specification and drawings, being limited solely by the appended claims.

The invention claimed is:

1. A process for producing alcohol by split-feed distillation, comprising the following steps:
  a) splitting a flow of wine to feed first and second distillation columns, the first distillation column generating a first flow of phlegm and the second distillation column generating a second flow of phlegm and a first flow of vinasse;
  b) feeding the first flow of phlegm into a first rectification column generating a first top flow and a first flow of hydrated alcohol;
  c) effecting heat exchange between the first top flow from said first rectification column and the first flow of vinasse from the second distillation column in a first falling film heat exchanger; and
  d) feeding the second flow of phlegm into a second rectification column generating a second flow of hydrated alcohol.

2. The process according to claim 1, wherein the first distillation column operates at low pressure and the second distillation column operates under vacuum.

3. The process according to claim 1, wherein said first rectification column operates at low pressure and the second rectification column operates under vacuum.

4. The process according to claim 1, wherein fusel oil is removed from said first and second rectification columns.

5. The process according to claim 1, wherein the first and second rectification columns each generate first and second flows of phlegm-vinasse, respectively.

6. The process according to claim 5 wherein the first and second flows of phlegm-vinasse recycle to the first and second distillation columns, respectively.

7. The process according to claim 1, wherein, after going through said first heat exchanger, the first top flow recycles into said first rectification column and a second flow of vinasse recycles into the second distillation column.

8. The process according to claim 1, further comprising
  i) splitting the first flow of phlegm to feed third and fourth rectification columns, each one generating second and third top flows and third and fourth flows of hydrated alcohol, respectively;
  ii) the first flow of vinasse from the second distillation column is split into second and third flows of vinasse;
  iii) the second top flow from the third rectification column exchanges heat with the second flow of vinasse in a second falling film heat exchanger; and
  iv) the third top flow from the fourth rectification column exchanges heat with the third flow of vinasse in a third falling film heat exchanger.

9. The process according to claim 8, wherein the second distillation column operates at low pressure and the third distillation column operates under vacuum.

10. The process according to claim 8, wherein the third and fourth rectification columns operate at low pressure and the second rectification column operates under vacuum.

11. The process according to claim 8, wherein fusel oil is removed from the second, third, and fourth rectification columns.

12. The process according to claim 8, wherein the second, third, and fourth rectification columns generate third, fourth and fifth flows of phlegm-vinasse, respectively.

13. The process according to claim 12, wherein the fourth flow of phlegm-vinasse is fed into the third rectification column and the third and fifth flows of phlegm-vinasse recycle to the first and second distillation columns, respectively.

14. The process according to claim 8, wherein, after going through the second falling film heat exchanger, the second top flow recycles into the third rectification column and the second flow of vinasse recycles into the second distillation column.

15. The process, according to claim 8, wherein, after going through the third heat exchanger, the third top flow recycles into the fourth rectification column and the third flow of vinasse recycles into the second distillation column.

16. The process according to claim 15, wherein the second rectification column comprises at least one packing section.

17. The process according to claim 16, wherein said at least one packing section comprises plastic packing or random packing.

18. The process according to claim 16, wherein the second rectification column comprises a valve tray section below the packing section.

19. The process according to claim 18, wherein the second rectification column comprises a sieve tray section below the valve tray section.

20. A system for producing alcohol by split-feed distillation comprising:
  a) a first distillation column receiving a first flow of wine generating a first flow of phlegm;
  b) a second distillation column, receiving a second flow of wine generating a second flow of phlegm and a first flow of vinasse;
  c) a first rectification column receiving the first flow of phlegm generating a first top flow and a first flow of hydrated alcohol;
  d) a first falling film heat exchanger effecting heat exchange between the first top flow from said first rectification column and the first flow of vinasse from the second distillation column; and
  e) a second rectification column receiving the second flow of phlegm generating a second flow of hydrated alcohol.

21. The system according to claim 20, wherein the first distillation column operates at low pressure and the second distillation column operates under vacuum.

22. The system according to claim 20, wherein said first rectification column operates at low pressure and the second rectification column operates under vacuum.

23. The system according to claim 22, wherein fusel oil is removed from said first and second rectification columns.

24. The system according to claim 22, wherein the first and second rectification columns each generate first and second flows of phlegm-vinasse, respectively.

25. The system according to claim 24, wherein the first and second flows of phlegm-vinasse recycle to the first and second distillation columns, respectively.

26. The system according to claim 25, wherein said first rectification column receives the first top flow and said second distillation column receives a second flow of vinasse, after said flows have gone through said first heat exchanger.

27. The system according to claim 20, wherein:
  i) said first rectification column consists of a third and fourth rectification columns, each one generating second and third top flows and third and fourth flows of hydrated alcohol, respectively;
  ii) the first flow of vinasse from the second distillation column is split into second and third flows of vinasse;
  iii) said first heat exchanger consists of second and third filling film heat exchangers;
  iv) the second falling film heat exchanger effects heat exchange between the second top flow from the third rectification column and the second flow of vinasse; and
  v) the third falling film heat exchanger effects heat exchange between the third top flow from the fourth rectification column and the third flow of vinasse.

28. The system according to claim 27, wherein the second distillation column operates at low pressure and the third distillation column operates under vacuum.

29. The system according to claim 27, wherein the third and fourth rectification columns operate at low pressure and the second rectification column operates under vacuum.

30. The system according to claim 29, wherein fusel oil is removed from the second, third, and fourth rectification columns.

31. The system according to claim 30, wherein the second, third, and fourth rectification columns generate third, fourth and fifth flows of phlegm-vinasse, respectively.

32. The system according to claim 31, wherein the third rectification column receives the fourth flow of phlegm-vinasse, and the first and second distillation columns receive the third and fifth flows of phlegm-vinasse, respectively.

33. The system according to claim 32, wherein the second rectification column receives the second top flow and the second distillation column receives the third flow of vinasse, after said flows have gone through said second heat exchanger.

34. The system according to claim 32, wherein the fourth rectification column receives the third top flow and the second distillation column receives the third flow of vinasse, after said flows have gone through the third heat exchanger.

35. The system according to claim 34, wherein the second rectification column comprises at least one packing section.

36. The system according to claim 35, wherein said at least one packing section comprises plastic packing or random packing.

37. The system according to claim 35, wherein the second rectification column comprises a valve tray section below the packing section.

38. The system according to claim 37, wherein the second rectification column comprises a sieve tray section below the valve tray section.

* * * * *

UNITED STATES PATENT AND TRADEMARK OFFICE
CERTIFICATE OF CORRECTION

PATENT NO. : 8,287,698 B2  
APPLICATION NO. : 12/280618  
DATED : October 16, 2012  
INVENTOR(S) : Martins De Queiroz Guimarães et al.

Page 1 of 1

It is certified that error appears in the above-identified patent and that said Letters Patent is hereby corrected as shown below:

Column 5,  
Line 60, "IO'"" should read --10--.

Column 10,  
Line 45, "filling film" should read --falling film--.

Signed and Sealed this  
Ninth Day of April, 2013

Teresa Stanek Rea  
*Acting Director of the United States Patent and Trademark Office*